Oct. 27, 1964  L. E. JOHNSON  3,154,264
SPIN CASTING FISHING REEL WITH LEVEL WIND
Filed Nov. 9, 1962  3 Sheets-Sheet 1

INVENTOR.
LLOYD E. JOHNSON
BY
Carlsen, Carlsen & Sturm
ATTORNEYS

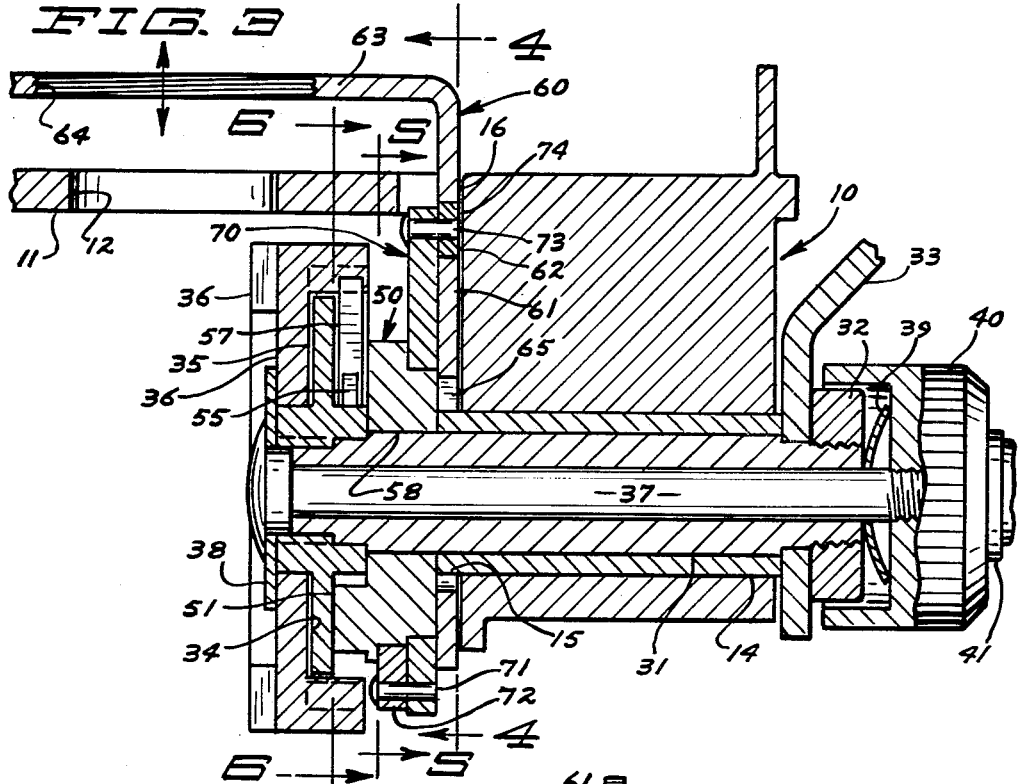
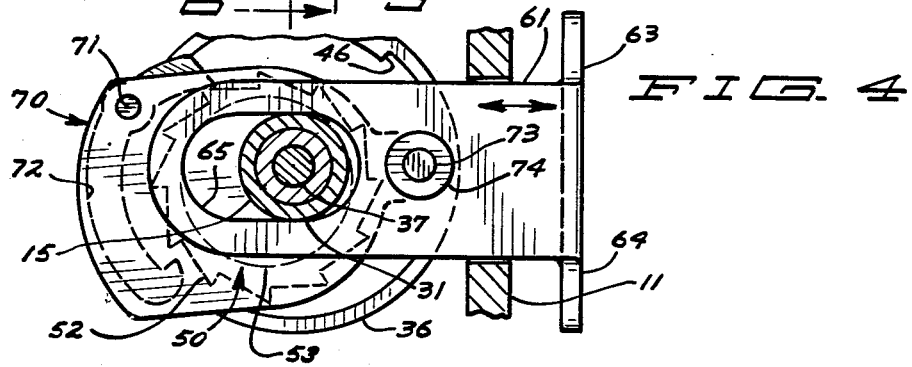
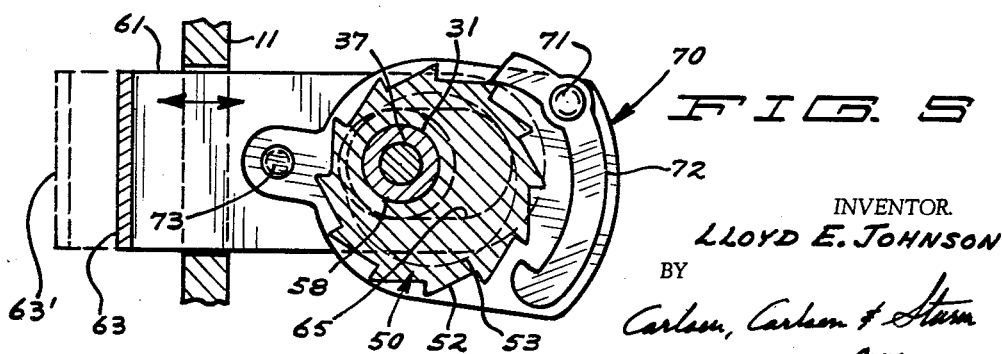

Oct. 27, 1964  L. E. JOHNSON  3,154,264
SPIN CASTING FISHING REEL WITH LEVEL WIND
Filed Nov. 9, 1962  3 Sheets-Sheet 3

INVENTOR.
LLOYD E. JOHNSON
BY
Carlson, Carlson & Sturm
ATTORNEYS

United States Patent Office 3,154,264
Patented Oct. 27, 1964

3,154,264
SPIN CASTING FISHING REEL WITH
LEVEL WIND
Lloyd E. Johnson, Mankato, Minn., assignor to Denison-Johnson, Inc., Mankato, Minn., a corporation of Minnesota
Filed Nov. 9, 1962, Ser. No. 236,605
6 Claims. (Cl. 242—84.21)

This invention relates generally to fishing reels of the spin casting type and is more particularly related to improvements in the driving mechanism therefor.

More particularly my invention relates to an improved driving mechanism for operating a spooling member which has an integral adjustable drag means and an interrelated reciprocating spool mounting means which reciprocates a spool relative to the spooling means during such time as the line is being rewound unto the reel. As such, my invention constitutes improvements over those contained in my co-pending application Serial No. 119,181 filed June 23, 1961 and entitled Fishing Reel.

In the present invention a novel and improved drive mechanism includes a means for reciprocatingly mounting a spool member to cooperatively provide an improved driving mechanism and level wind operation for spooling the line during the retrieval operation. As in the above noted copending application, the drive mechanism provides an adjustable drag mode of operation and a direct coupling mode for driving a spooling member, or flier, and the mechanism is automatically responsive to rotation of a crank handle or rotation of the spooling member to operate in one of the two above described modes of operation. An improved mounting and level wind assembly for reciprocatingly driving a spool member is mounted on and forms an integral part of the drive assembly.

It is therefore an object of this invention to provide a combined mechanism for controlling the operation of a spooling member and reciprocatingly mounting a spool member in a spin casting reel.

Another object of this invention is to provide improved apparatus for variably connecting a spooling member to a crank handle in a fishing reel.

Another object of this invention is to provide improved mounting means for a spool member in a fishing reel.

These and other more detailed and specific objects will be disclosed in the course of the following specification, reference being had to the accompanying drawings, in which—

FIG. 3 is an enlarged sectional drawing of a portion of FIG. 2;

FIG. 4 is a sectional view of FIG. 3 taken along section lines 4—4.

Figure 6:
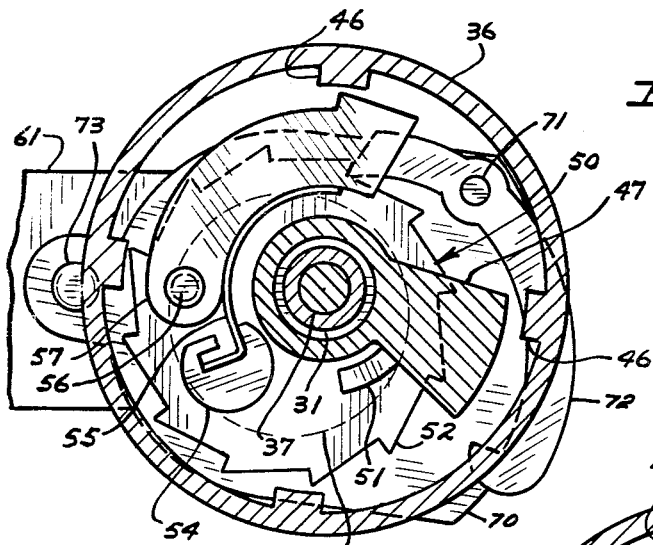
Figure 7:
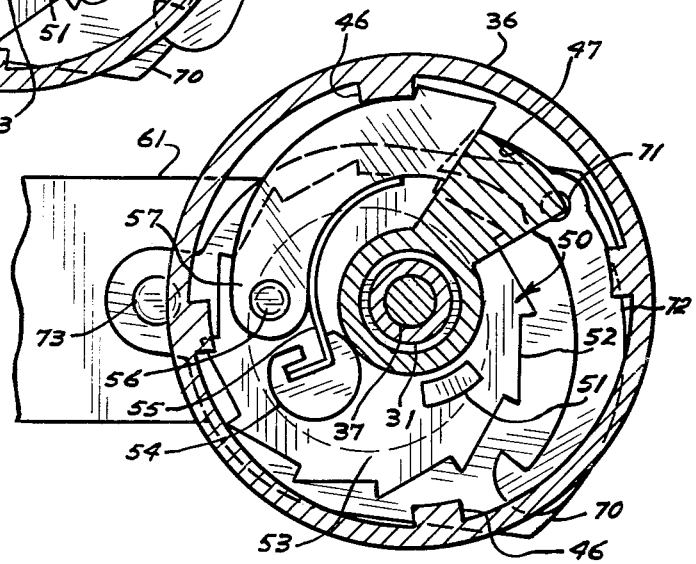

FIG. 5 is a two-position sectional view taken along section lines 5—5 on FIG. 3, and FIGS. 6 and 7 are sectional views taken along section lines 6—6 of FIG. 3 showing the two modes of operation of the driving mechanism of my invention.

Referring now to the drawings in which like elements may be identified by like reference numerals, there is shown a closed face spinning reel which includes a crank handle 33, a front cover member 22 having an opening 24 at the left center thereof through which is theaded a fishing line 27, and a rear cover member 20 which is threadably connected to front cover member 22 through coacting threads 23 and which has mounted thereon, a control lever to be used in operation of the reel.

Figure 1:
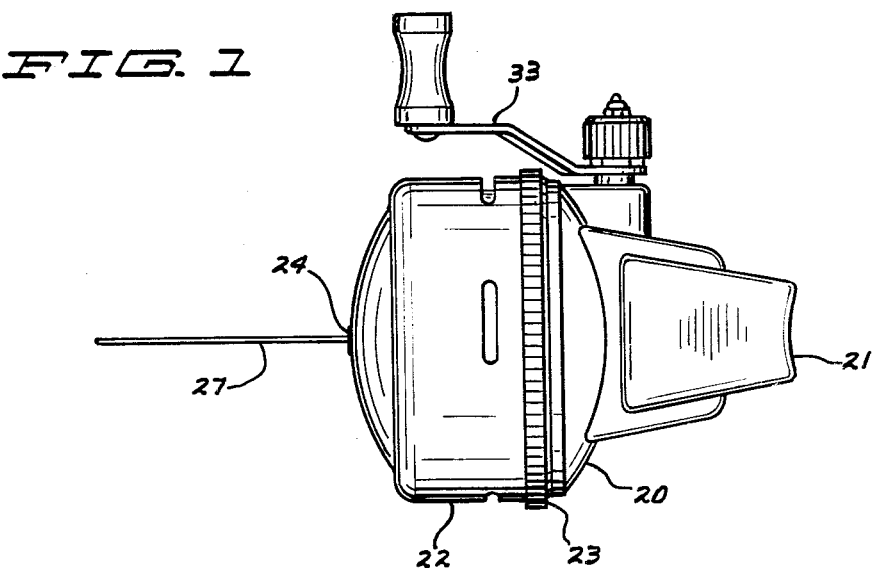
FIG. 1 is a top view of a closed face spinning reel.
Figure 2:
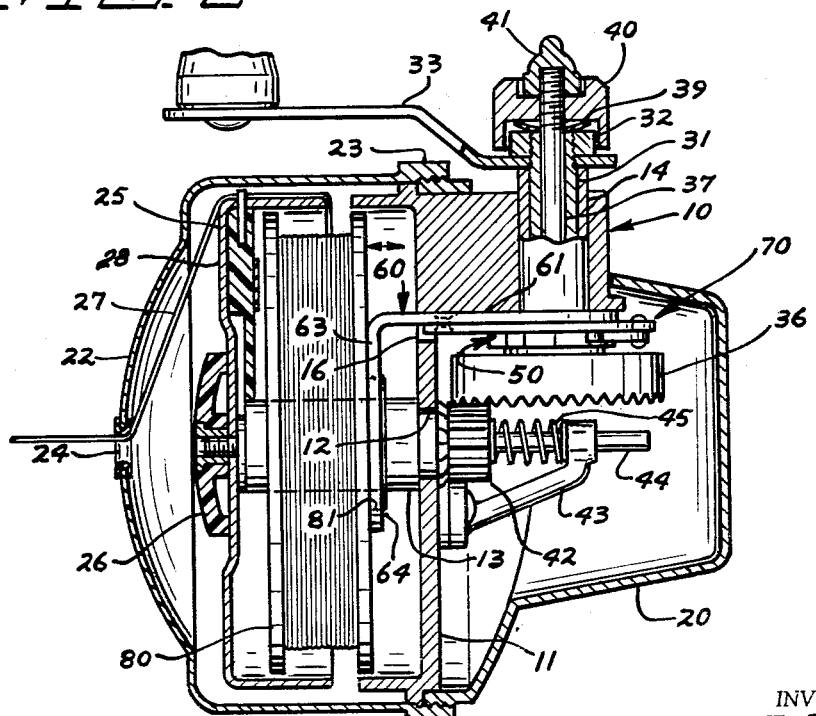
FIG. 2 is an enlarged sectional view of the spinning reel of FIG. 1.

In FIG. 2 and FIG. 3 a frame member 10 includes a plate shaped portion 11 which has an opening 12 at the center thereof into which is securely mounted a forwardly extending tubular bearing member 13. A rearward extending portion of frame 10 has an opening at right angles to the axis of tubular bearing member 13 and has mounted therein a tubular bearing member 14 which extends toward the inside of the reel assembly as indicated by reference numeral 15.

A drive shaft 44 extends through tubular bearing member 13 and is provided with a threaded portion at its forward end upon which is nonrotatably mounted a spooling member 25 which is held in place by a threaded fastening member 26. A pinion member 42 is nonrotatably slidably mounted at the rearwardly extending portion of drive shaft 44. Drive shaft 44 extends through a journal member 43 which is attached by suitable fastening means to the rear surface of plate portion 11 of frame 10. A compression spring member 45 is mounted between pinion gear 42 and a spring clip (not shown) on drive shaft 44 so as to bias drive shaft 44 to a rearward position.

A pickup pin assembly 28 is slidably mounted on the inside of spooling member 25 and is adapted to coact with a cam surface (not shown) on the front end of forwardly extending tubular bearing member 13 to radially extend or retract a pickup pin for engagement and disengagement with line 27. For a more thorough understanding of this portion of the apparatus, reference is made to U.S. Patent No. 2,828,088, issued March 25, 1958 in the names of H. W. Denison et al. on an application filed April 15, 1954 for Spinning Reel.

A crankshaft 31 is rotatably journaled in bearing 14. Crankshaft 31 includes a nonrotatably mounted drive disc 34 at its left hand end and a nonrotatably mounted crank handle 33 held in position by a screw threaded fastening member 32 at its right hand end. Drive disc 34 is provided with a noncircular opening at its center for engagement by the head of a drag adjusting screw 37 which extends through the center of crankshaft 31 to a drag adjusting member 40 which is threadably mounted on the end of drag adjusting screw 37. A spring member 39 is positioned intermediate drag adjusting member 40 and the end of crankshaft 31 and a further screw threaded fastener 41 is mounted on the right hand end of drag adjusting screw 37. A gear member 36 is mounted between drag washers 35 and 38. Gear member 36 is provided with a plurality of inwardly facing teeth for engagement with pinion gear 42 on drive shaft 44 and is provided with an outwardly facing portion containing a recess having a plurality of radially inwardly extending lugs 46 for coaction with a drive pawl and click assembly mounted on an anti-reverse disc 50 rotatably mounted on crankshaft 31 and positioned intermediate the inwardly facing end of tubular bearing 14 and the outwardly facing portion of drive disc 34. Drive disc 34 includes an axially extending projection 47 which extends into contact with the left hand face of anti-reverse disc 50.

Anti-reverse disc 50 has an axially extending lug 51 which may be engaged by projection 47 and an axially extending circular pin upon which is rotatably journaled a drive pawl member 57 that is spring biased radially outwardly by spring means 55 mounted on axially extending projection 54. A plurality of axially extending ratchet teeth 52 are provided around the periphery of anti-reverse disc 50 on a circular portion thereof which is disposed eccentrically with respect to the center of rotation of anti-reverse disc 50 as it rotates on crankshaft 31. A further axially extending eccentrically disposed portion 53 serves as a cam and is in engagement with a circular opening therefor in cam follower 70.

Cam follower 70 is provided at its rearward end with an anti-reverse pawl 72 rotatably mounted on pin 71 and in cooperative relationship with the eccentrically disposed anti-reverse ratchet portion of anti-reverse disc 50. At the forward end of cam follower member 70 is a pin and drive bearing assembly 74 and 73, respectively, which is adapted to operatively connect cam follower 70 to an oscillating yoke 60 in a manner which allows relative rotation therebetween.

Oscillating yoke 60 includes a forward portion 63 which is provided with a threaded circular opening 64 which surrounds forwardly extending tubular bearing member 13 on frame 10 and is adapted to receive and hold a threaded boss of spool member 80. Oscillating yoke 60 also has a rear portion 61 which is provided with an elongated opening 65 that is journaled on portion 15 of bearing 14 mounted in frame 10. By virtue of the opening 16 in frame 10 and the elongated hole 65 journaled on portion 15 of bearing 14, oscillating yoke 60 may be reciprocated back and forth in the direction shown by the arrows in the several views of the drawing.

Referring now to FIGS. 6 and 7, it will be seen that axially extending portion 47 of drive disc 34 is operative between the position of engagement with axially projecting lug 51 on anti-reverse disc 50 and engagement with drive pawl 57 mounted on anti-reverse disc 50. Relative movement between anti-reverse disc 50 and drive disc 34 serves to effect a positive driving engagement from crank handle 33 to spooling member 25 when the relationship shown in FIG. 7 exists and allows adjustable friction drag connection between crank handle 33 and spooling member 25 when the relationship shown in FIG. 6 exists.

Under normal operating conditions, the adjustable friction between gear 36 and drive disc 34 will tend to drive the crankshaft assembly and crank handle 33 in a reverse direction. Therefore, as is illustrated in FIG. 6, reverse motion of anti-reverse disc 50 causes engagement of one of the two ratchet teeth engaging portions of anti-reverse pawl 72 to prevent reverse motion of anti-reverse disc 50 and allow relative rotational motion between drive disc 34 and anti-reverse disc 50 to provide the operation and relationship of the various members as shown in FIG. 6. When in the mode of operation shown in FIG. 6, drive pawl 57 serves as a means for providing an audible click as it engages and disengages the inwardly projecting lugs 46 on gear 36. Spring member 55 serves as a bias to tend to provide resilient releasing engagement with lugs 46 which produces an audible click to the operator of the reel.

Referring now to FIGS. 4 and 5, the operation of oscillating yoke 60 during the time that crank handle 33 is rotated in a line retrieving or clockwise direction is assumed. It may be seen that the engagement of cam follower 70 with the eccentrically disposed cam surface 53 on anti-reverse disc 50 serves to move cam follower 70 in a circular orbit around the axis of crankshaft 31. A linear motion is imparted to oscillating yoke 60 by virtue of the connecting means 73 and 74 in rotatable engagement with opening 62 in oscillating yoke 60. The elongated opening 65 in rearwardly extending portion 61 of oscillating yoke 60 reciprocates back and forth on portion 15 of bearing member 14 and the forward portion 63 of oscillating yoke 60, upon which the line spool 80 is mounted, reciprocates back and forth between the positions 63 and 63' indicated on FIG. 5 in solid and phantom outline. The anti-reverse pawl allows anti-reverse disc 50 to rotate in this direction and during this mode of operation, the drive connection to gear 36 is that which is shown in FIG. 7 to provide a direct driving connection to spooling member 25.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a spin casting reel of the class including a right angle driving mechanism for rotatably driving a spooling means in one direction and for frictionally retarding the rotation of the spooling means in another direction, the combination, comprising; spool mounting means reciprocatively mounted on a driving mechanism, said driving mechanism including a crankshaft and a driven shaft, said mounting means being so constructed and arranged to reciprocate radially with respect to said crankshaft and axially with respect to said driven shaft; circular cam means rotatably and eccentrically mounted on said crankshaft, said cam means including a plurality of ratchet teeth; cam follower means journaled on said circular cam means rotatably connected to said spool mounting means, said cam follower means also including a rotatably mounted pawl disposed in operative relationship with the ratchet teeth on said circular cam means; and two position coupling means, including means for rotating said cam means, interconnecting said crankshaft and said driven shaft, said two position coupling means also being responsive to engagement of the ratchet teeth on said circular cam means by said pawl to become operative in only one of said two positions.

2. In a spin casting reel of the class having a frame including a face plate, a rotatable spooling member and a non-rotatable line spool, the combination comprising; a tubular bearing member extending forwardly of a face plate on a reel frame; a driven shaft rotatably journaled in said tubular bearing member; a spooling member non-rotatably mounted on the forward end of said driven shaft; a further bearing member disposed rearwardly of and parallel to said face plate; a crankshaft rotatably journaled in said further bearing member; a handle on one end of said crankshaft for rotating the same; a spool mounting member including a rearwardly disposed slot adapted to reciprocably journal said mounting member on said crankshaft intermediate the ends thereof, a forwardly extending portion, disposed generally parallel to said tubular bearing member, and extending through an aperture in the face plate on said frame, and a further portion disposed forwardly and generally parallel to said face plate, said further portion being adapted to support a line spool and to reciprocate the line spool axially of said tubular bearing member; circular cam means rotatably and eccentrically disposed on said crankshaft adjacent to the rearward end of said spool mounting member, said cam means including a pair of axially extending stop members; cam follower means rotatably journaled on said cam means and connected to said spool mounting to reciprocate the same in forward and rearward directions, said cam follower means including means for restricting rotation of said cam means to one direction; a drive disc non-rotatably disposed on the other end of said crankshaft, said drive disc having an axially extending portion adapted to engage one or the other of the pair of axially extending stop members on said cam means to drive the same on rotation of said crankshaft in one direction; and coupling means frictionally interconnecting said drive disc and said driven shaft whereby said driven shaft is rotated and said line spool is reciprocated upon rotation of said crankshaft in said first direction and said driven shaft may rotate in a reverse direction independently of said crankshaft.

3. The apparatus of claim 2 in which the further portion on the spool mounting member is disposed circumferentially of the tubular bearing member and is provided with an internal threaded portion for receiving a threaded boss on a line spool for supporting the same for reciprocation on the tubular bearing member.

4. The apparatus of claim 2 in which the circular cam means includes a plurality of ratchet teeth disposed peripherally thereof and in which said means on the cam follower means includes a pawl rotatably mounted on the cam follower means, said pawl and said ratchet teeth being adapted to cooperate to restrict the rotation of the cam means to one direction.

5. In a spin casting reel of the class having a frame including a face plate, a rotatable spooling member and a non-rotatable line spool, the combination comprising; a tubular bearing member extending forwardly of a face plate on a reel frame; a driven shaft rotatably journaled in said tubular bearing member; a spooling member non-rotatably mounted on the forward end of said driven shaft; a further bearing member disposed rearwardly of and parallel to said face plate; a crankshaft rotatably journaled in said further bearing member; a handle on one end of said crankshaft for rotating the same; an L-shaped spool mounting member having one leg disposed parallel to the face plate on a reel frame and adapted to support a line spool for reciprocation axially of said tubular bearing member and the other leg extending rearwardly through the face plate and being radially slidably disposed on said crankshaft; circular cam means rotatably and eccentrically disposed on said crankshaft adjacent to said spool mounting member, said cam means including a pair of axially extending stop members; cam follower means rotatably journaled on said cam means and connected to said spool mounting member to reciprocate the same in forward and rearward directions relative to the face plate on the reel frame, said cam follower means including means for restricting rotation of said cam means to one direction; and two position coupling means, including an axially extending portion adapted to engage one or the other of the pair of axially extending stop members on said cam means, interconnecting said crankshaft and said driven shaft, said two position coupling means being operative to drive said driven shaft and said circular cam means upon rotation of said crankshaft in a first direction and said driven shaft may rotate in a reverse direction independently of said crankshaft.

6. The apparatus of claim 5 in which a plurality of ratchet teeth are disposed around the periphery of the circular cam means and the means for restricting rotation of the cam means to one direction on said cam follower means is comprised of a rotatably mounted pawl on said cam follower means.

References Cited in the file of this patent
UNITED STATES PATENTS

| | | |
|---|---|---|
| 1,836,755 | Hirsch | Dec. 15, 1931 |
| 2,542,810 | Gray | Feb. 20, 1951 |
| 2,580,963 | Sisson | Jan. 1, 1952 |
| 2,586,921 | Delphon | Feb. 26, 1952 |
| 2,613,883 | Limpright | Oct. 14, 1952 |
| 2,711,292 | Taggart et al. | June 21, 1955 |
| 2,734,693 | Rabezzana | Feb. 14, 1956 |
| 2,853,085 | Torkelson | Sept. 23, 1958 |
| 3,025,020 | Sarah | Mar. 13, 1962 |